United States Patent

[11] 3,610,319

[72] Inventors  Otmar Kleinhagauer;
Wolfgang Holzgruber, both of Kapfenberg, Austria
[21] Appl. No.  796,772
[22] Filed  Feb. 5, 1969
[45] Patented  Oct. 5, 1971
[73] Assignee  Gebr. Bohler & Co.
Kapfenberg, Austria
[32] Priority  Feb. 12, 1968
[33]  Austria
[31]  A 1272/68

[54] APPARATUS FOR THE PRODUCTION OF HOLLOW INGOTS OF METAL BY ELECTRIC SLAG REFINING
3 Claims, 2 Drawing Figs.
[52] U.S. Cl. ................................................ 164/252, 13/15
[51] Int. Cl. .................................................... B22d 27/02
[50] Field of Search ....................................... 164/252, 250, 85

[56]  References Cited
UNITED STATES PATENTS
2,369,233  2/1945  Hopkins .................. 164/252 X
2,380,238  7/1945  Hopkins .................. 164/52 X
2,388,974  11/1945  Hopkins .................. 164/52
2,397,789  4/1946  Hopkins .................. 164/133
2,405,254  8/1946  Hopkins .................. 249/78
2,937,422  5/1960  Bohme .................... 164/252 X
3,268,958  8/1966  Sickbert .................. 164/133 X
3,344,839  10/1967  Sunnen .................... 164/250 X FOREIGN PATENTS
1,057,291  5/1959  Germany .................. 164/281

Primary Examiner—J. Spencer Overholser
Assistant Examiner—V. K. Rising
Attorney—Arthur O. Klein ABSTRACT: In an electric slag-refining arrangement a system for cooling a mold with liquid. An electric power source is connected in circuit with said mold and with fusible electrode means and is operable to cause said electrode means to fuse down. A core extends into said mold at least partly the length of the core and defines within said mold an annular molding cavity, which receives said electrode means.

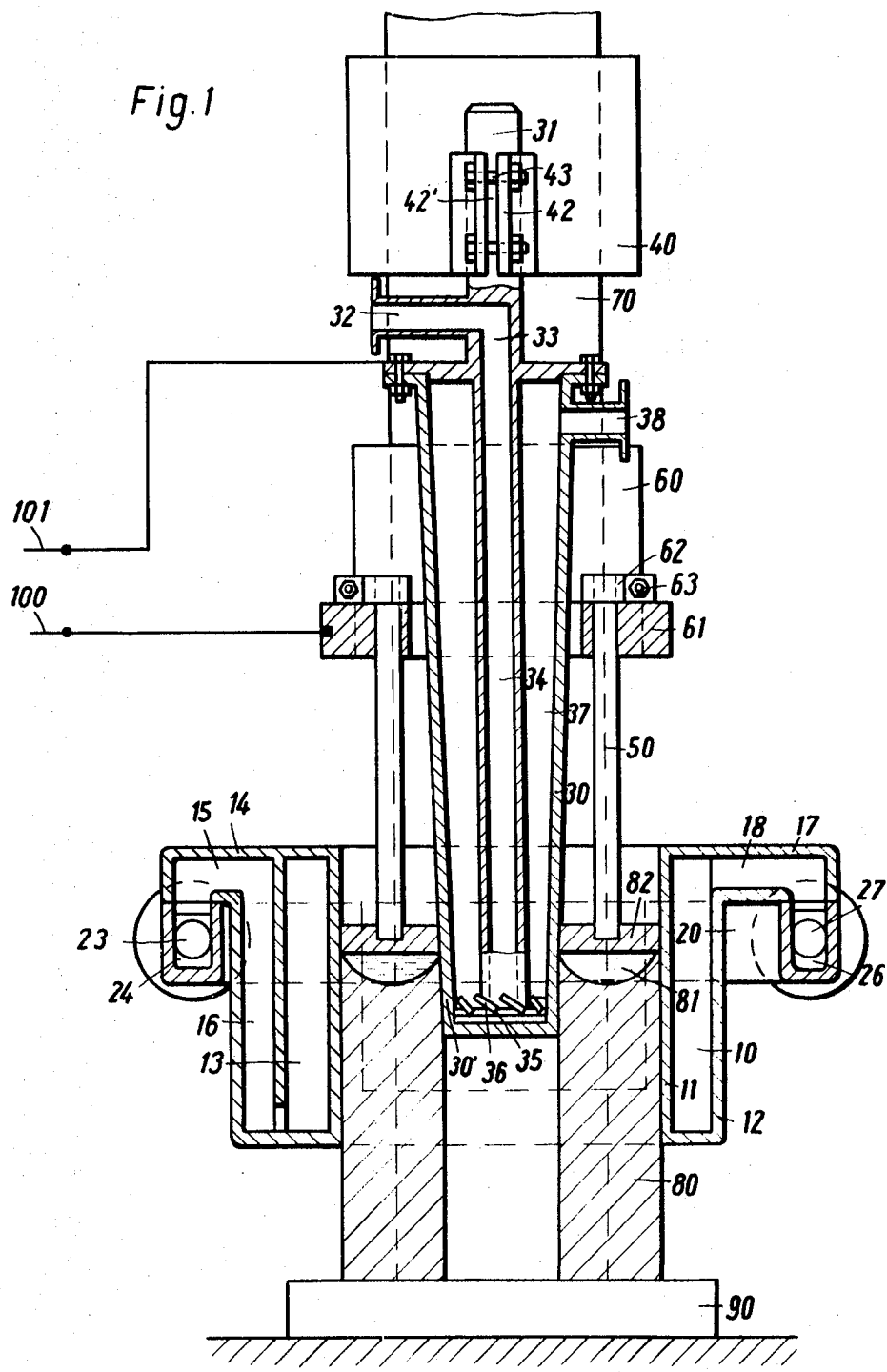

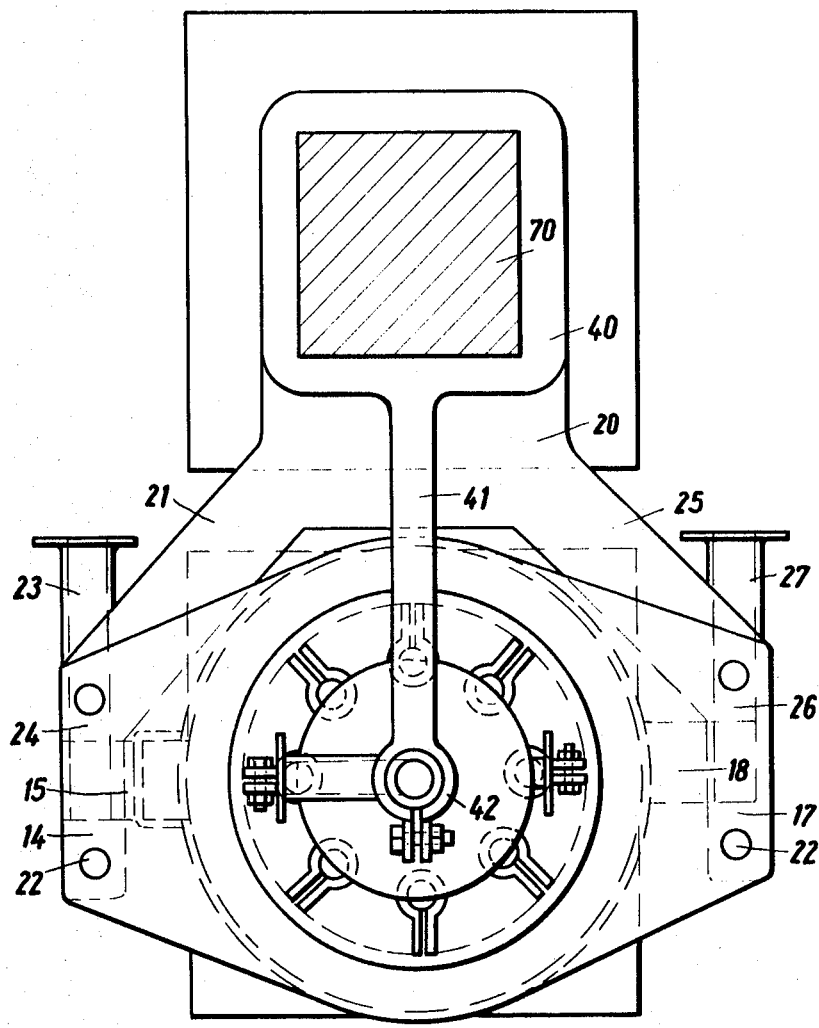

3,610,319

APPARATUS FOR THE PRODUCTION OF HOLLOW INGOTS OF METAL BY ELECTRIC SLAG REFINING

This invention relates to an apparatus for the production of hollow ingots of metal, particularly of steel, by electric slag refining with the aid of a liquid-cooled mold.

It is an object of the invention to make hollow ingots of metal, particularly of steel, by electric slag refining. According to the invention, this object is accomplished in an apparatus of the kind mentioned first hereinbefore. A core is provided, which at least in part of its length is surrounded by the mold and which is preferably connected by an electric lead to one terminal of the source of electric power which is used.

Further details of the apparatus according to the invention will become apparent from the accompanying description of an embodiment which is shown diagrammatically and by way of example in the drawings, in which FIG. 1 is a longitudinal vertical sectional view showing the apparatus for making hollow steel ingots; and FIG. 2 is a top plan view showing the same apparatus.

The downwardly tapering hollow core 30 consisting preferably of copper is coaxial to the cylindrical molding wall 11 of the mold 10. A plurality of rod-shaped electrodes 50, which can be fused down at the same time, extend downwardly as shown in FIG. 1 extend into the annular gap between the mold 10 and the core 30. These electrodes are identical, preferably circular in cross section, and are equally spaced on a circle which is concentric with respect to the core 30. The electrodes 50 are detachably secured by screws 63 to the terminals 62 provided on the upper side of the mounting ring 61.

Near its upper end, the core 30 has a cylindrical gripping pin 31, which is clamped by means of the two screws 43 mounted, as shown in FIG. 1, on the sleeve 42, which is provided on the arm portion 41. The sleeve 42 has a longitudinal slot 42'. The arm portion 41 and the mounting ring 61, from which the electrodes 50 are suspended, are secured to the lifting carriages 40 and 60, respectively. The side arms 14 and 17 of the mold 10 rest on the two forked arms 21 and 25 of the mold-lifting carriage 20 and are held in position on the same by the pins 22. All three lifting carriages 20, 40 and 60 are vertically displaceable on the square-section column 70, preferably with the aid of tension cables, not shown. This arrangement makes possible the production of relatively long ingots 80. The levels of the electrodes 50 are adjusted by moving the carriages 20, 40 and 60 relative to each other as the electrodes 50 are fused down. The adjustment along the column 70 is made in such a manner that the electrodes 50 enter the slag layer 82, which floats on the molten metal 81 and serves to refine and shield the molten steel. The ends of the electrodes are spaced the desired distance from the surface of the molten metal 81, and the relation of said metal surface relative to the mold remains unchanged except during the initial phase of the fusing process. Since the core 30 and the mold 10 are carried by different lifting carriages 40 and 20, it is also possible during the remelting operation to adjust the core 30 relative to the mold 10 in the direction of the longitudinal axis of the core. This fact is of special significance because in the production of relatively long tubular ingots 80 the mold 10 and the lower end of the core 30 must lie on the horizontally extending bottom slab 90 at the beginning of the fusion process. Since it is important that the lower end of the core 30 be considerably spaced above the lower end of the mold 10, as is shown in FIG. 1 of the drawing, as soon as the surface of the molten metal 81 in the mold 10 has reached a certain level the resulting hollow ingot 80 of metal can be easily stripped from the core 30.

In the production of short hollow ingots, the mold 10 is not lifted from the bottom plate 90 and rests on the same throughout the remelting operation. From one terminal of the power source, not shown, which is employed and consists, e.g., of the secondary winding of a transformer, an electric lead 100 extends to the mounting ring 61, to which the electrodes 50 are electrically conductively connected. The other terminal of the power source is connected by an electric lead 101 to the core 30. During the fusion operation, the mold 10 and the core 30 are cooled with water. Cooling water is conducted into the cavity between the outer shell 12 and the molding wall 11 of the mold 10 through a flexible tube, not shown, a connection pipe 23 and the ducts 24, 15 and 18 provided in the arm 21 of the mold-lifting carriage 20 and in the side arm 14 and in the mold. As soon as the cooling water has filled through the cavity 13 of the mold 10 from bottom to top, it is discharged through the ducts 18 and 26, formed in the side arm 17 of the mold 10 and in the arm 25 of the mold-lifting carriage 20, the connection pipe 27 and a flexible tube, which is not shown. Cooling water is fed to the lower end of the core 30 through a flexible tube, not shown, the lateral connection pipe 32 provided on the gripping pin 31, the duct 33 in the gripping pin 31 and the inner tube 34, which is concentric with respect to the longitudinal axis of the hollow core 30. The cooling water flows then through the stationary swirling device 35, which is secured at the lower end of the inner tube 34 and comprises axial vanes 36 extending to the outside wall 30' of the core 30. This swirling device imparts a swirling motion to the cooling water, which then flows from bottom to top through the cavity 37 between the outside wall 30' and the inner tube 34, the individual liquid particles moving along substantially helical paths. The cooling water is discharged through the connection pipe 38 at the upper end of the core 30. Cooling water flows through the two cavities 13 and 37 of the mold 10 and the core 30 at such rates that the velocities of flow of the cooling water in said cavities are sufficient to produce a high heat transfer rate. To increase the heat transfer rate, a helically wound deflecting wall may be provided in the cavity 13 of the mold 10 so that the cooling water flows along helical lines along the mold wall 11 at a relatively high velocity of flow throughout the height of the mold 10. The cavity 37 of the core 30 may also be provided with a helically wound deflector for the same purpose, rather than with the swirling device 35. The cooling water extracts heat through the molding wall 11 and the outside wall 30' of the core 30 at such a rate from the molten metal 81 formed in the mold as a result of the fusion process that only solidified steel emerges from the lower opening of the mold 10 when the same is slowly moved upwardly. This steel forms a solid, hollow ingot 80, which with its underside rests on the horizontally extending bottom plate 90 consisting of metal, preferably of copper.

The hollow ingots 80, produced with the aid of the embodiment of the apparatus according to the invention described hereinbefore, are tubular and have an annular shape in cross section. The apparatus according to the invention may be used to make hollow ingots which are different in cross-sectional shape provided that suitably shaped molds and cores are employed. Instead of a plurality of electrodes 50, which extend parallel to mold 10 and can be fused down at the same time, a precast tubular electrode may be used, which during the fusion process surrounds the core.

It is not essential that the core be held at its top end as in the embodiment which has been described hereinbefore and is shown on the drawing. Alternatively, the core may be secured to a rod which extends from below through the bottom plate.

The apparatus according to the invention enables a most efficient production of hollow ingots by electric slag refining, which consist of metal, particularly of steel, and are of particularly high purity.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. In an electric slag-refining arrangement for producing tubular metallic ingots,
    a support column;
    water-cooled mold means axially movably mounted on said column;

a metallic core at least partially extending into said water-cooled mold means during electric slag refining and being operatively movably supported by said column so as to move along the longitudinal axis of said mold means during electric slag refining; and electrode means mounted on said column and adapted to extend between said core and said mold means during electric slag refining.

2. In an electric slag-refining arrangement, the combination as set forth in claim 1, wherein said core has a frustoconical shape which tapers downwardly.

3. In an electric slag-refining arrangement, the combination as set forth in claim 1, wherein said core is connected to first carriage means movably mounted on said support column and said mold means is connected to second carriage means also movably mounted on said support column.